United States Patent [19]
Vismara

[11] Patent Number: 5,482,661
[45] Date of Patent: Jan. 9, 1996

[54] METHOD FOR MOLDING BONDED PLASTICS MATERIAL

[75] Inventor: Mario Vismara, Casatenovo, Italy

[73] Assignee: Devi S.p.A., Besana Brianza, Italy

[21] Appl. No.: 197,880

[22] Filed: Feb. 17, 1994

Related U.S. Application Data

[62] Division of Ser. No. 876,384, Apr. 30, 1992, Pat. No. 5,304,050.

[30] Foreign Application Priority Data

May 3, 1991 [IT] Italy ................... MI91A1214

[51] Int. Cl.⁶ .................... B29C 44/06; B29C 44/12
[52] U.S. Cl. .................... 264/413; 264/37; 264/46.4; 264/46.6; 264/46.8
[58] Field of Search .......... 264/25, 46.4, 46.6, 264/46.8, 37

[56] References Cited

U.S. PATENT DOCUMENTS

| | | | |
|---|---|---|---|
| 3,950,462 | 4/1976 | Shaffer et al. | 264/46.6 |
| 4,786,447 | 11/1988 | Kouda | 264/46.6 |
| 4,801,361 | 1/1989 | Bullard et al. | 264/51 |
| 5,091,031 | 2/1992 | Strapazzini | 264/46.8 |
| 5,284,608 | 2/1994 | Vismara | 264/553 |
| 5,326,517 | 7/1994 | Yaita et al. | 264/51 |

FOREIGN PATENT DOCUMENTS

| | | |
|---|---|---|
| 3604175 | 8/1986 | Germany. |
| 3637660 | 5/1987 | Germany. |
| 1447110 | 8/1976 | United Kingdom. |
| 2160148 | 12/1985 | United Kingdom. |

*Primary Examiner*—Allan R. Kuhns
*Attorney, Agent, or Firm*—Jacobson, Price, Holman & Stern

[57] ABSTRACT

In molding bonded plastics material, in particular expanded or foamable polystyrene in combination with rigid sheet polystyrene, the rigid material (2) is firstly preformed in a preforming mold (33, 36) while simultaneously separating by a cutter (40) the preformed portion from the rigid sheet of starting material, the preformed portion is transferred (27) to the molding stage (3) while contained in a preforming half-mold (33), foamable material (44) is fed to and is molded onto the preformed portion with sintering and the pulse action of steam (45), and the molded portion (P) is discharged (6). The preforming half-mold (33) is moved alternately between the preforming position (1) and the molding position (3), and cooperates with respective counter-molds (36,41). The scrap is recovered without being involved in the molding stage.

15 Claims, 7 Drawing Sheets

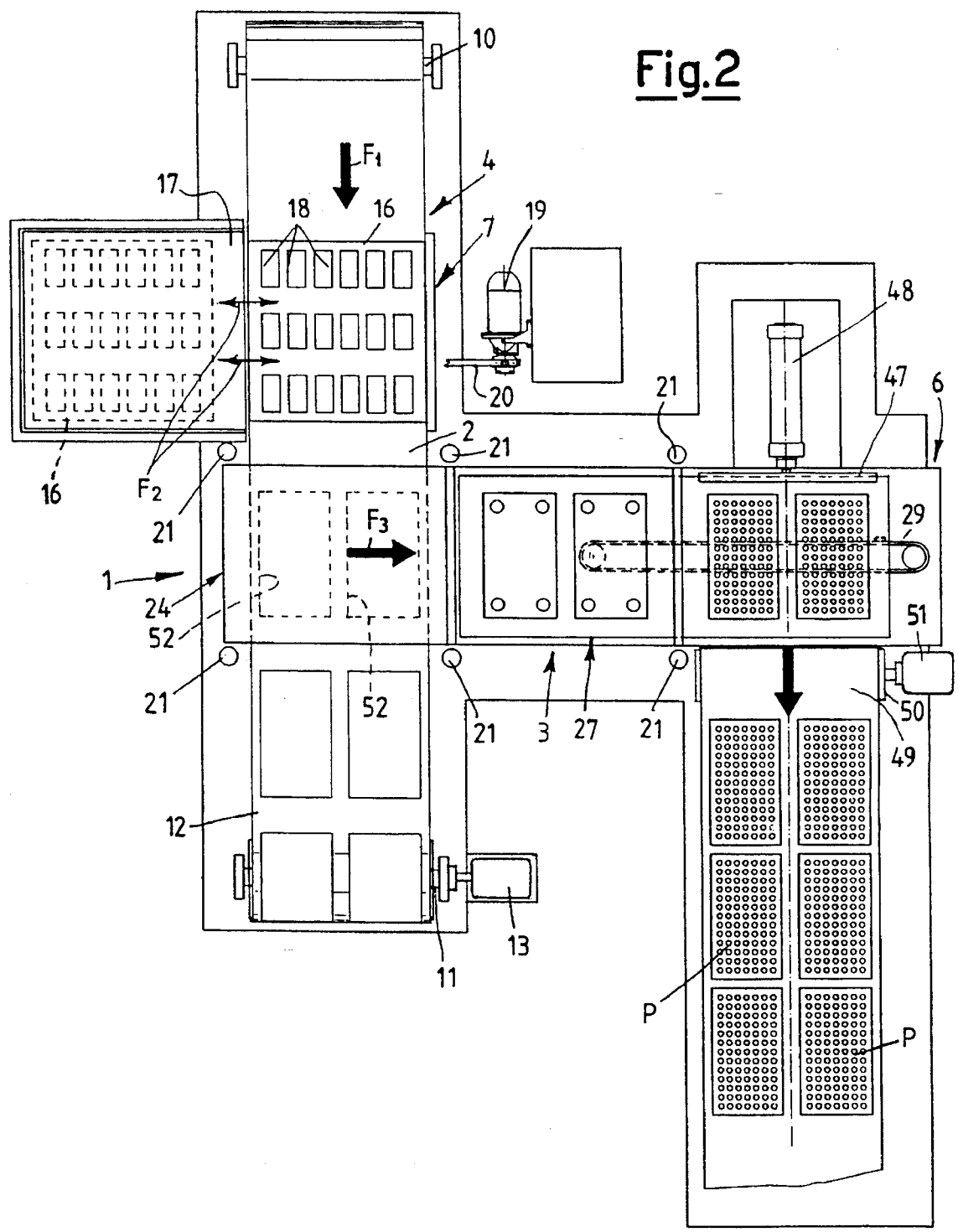

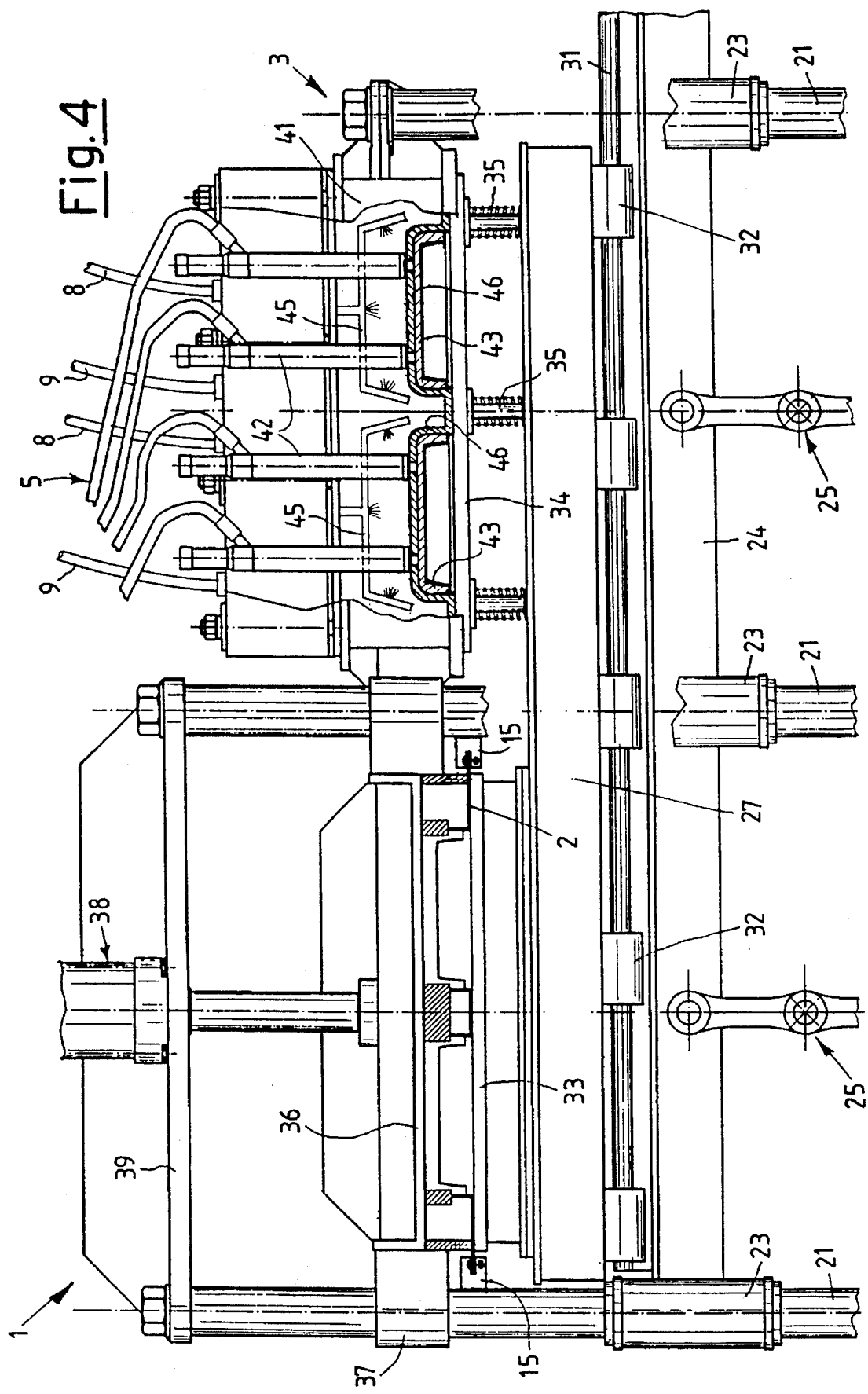

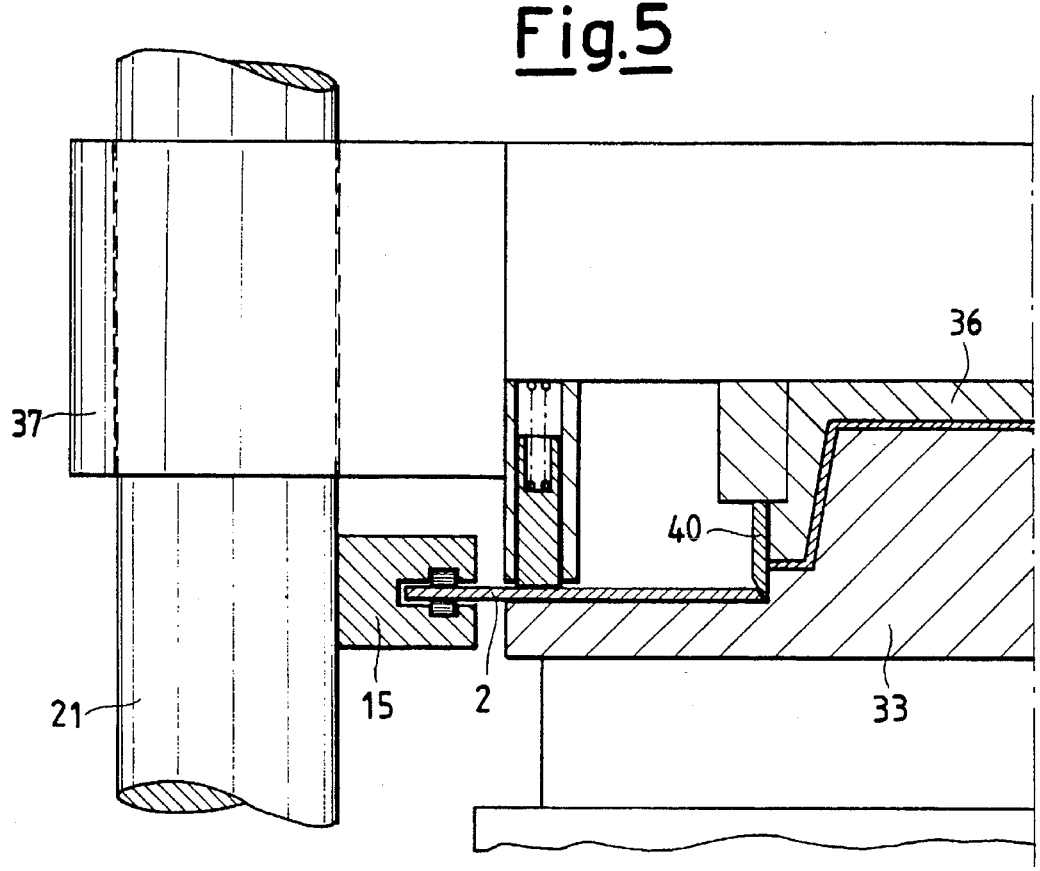
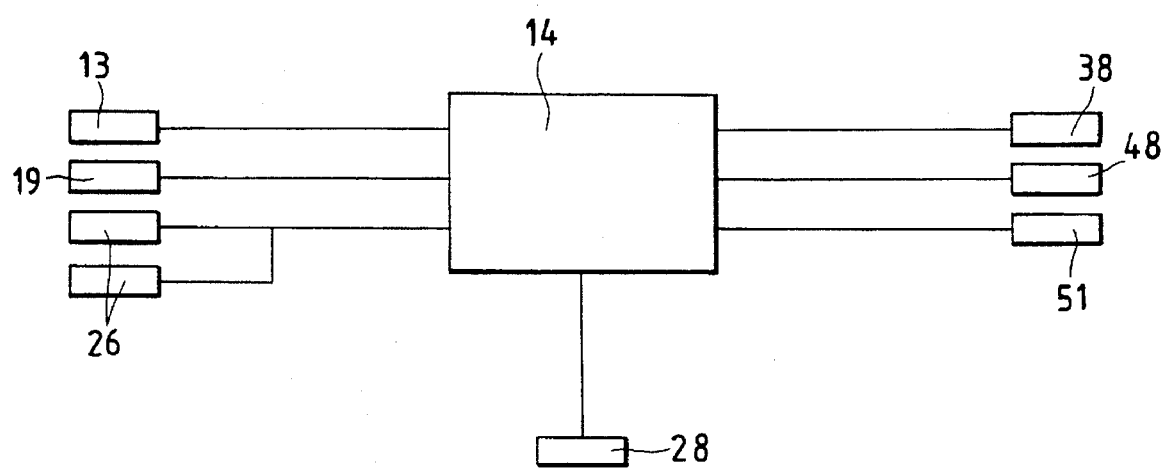

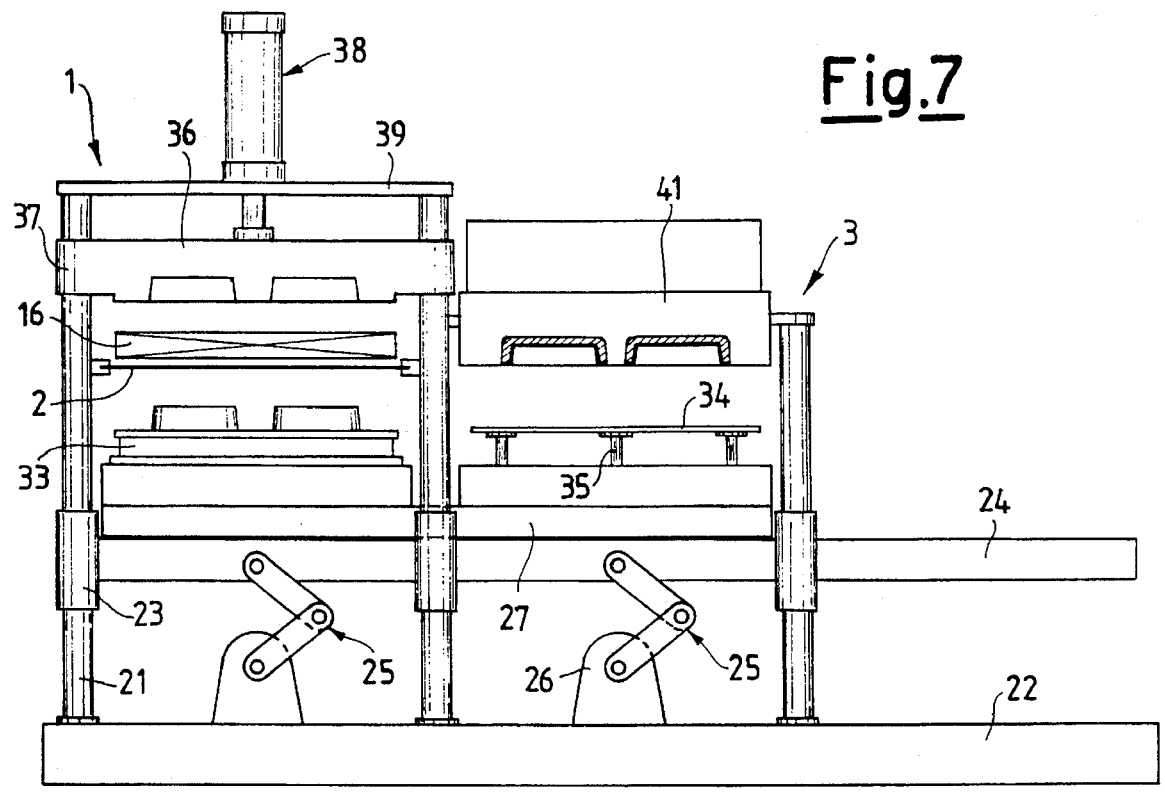
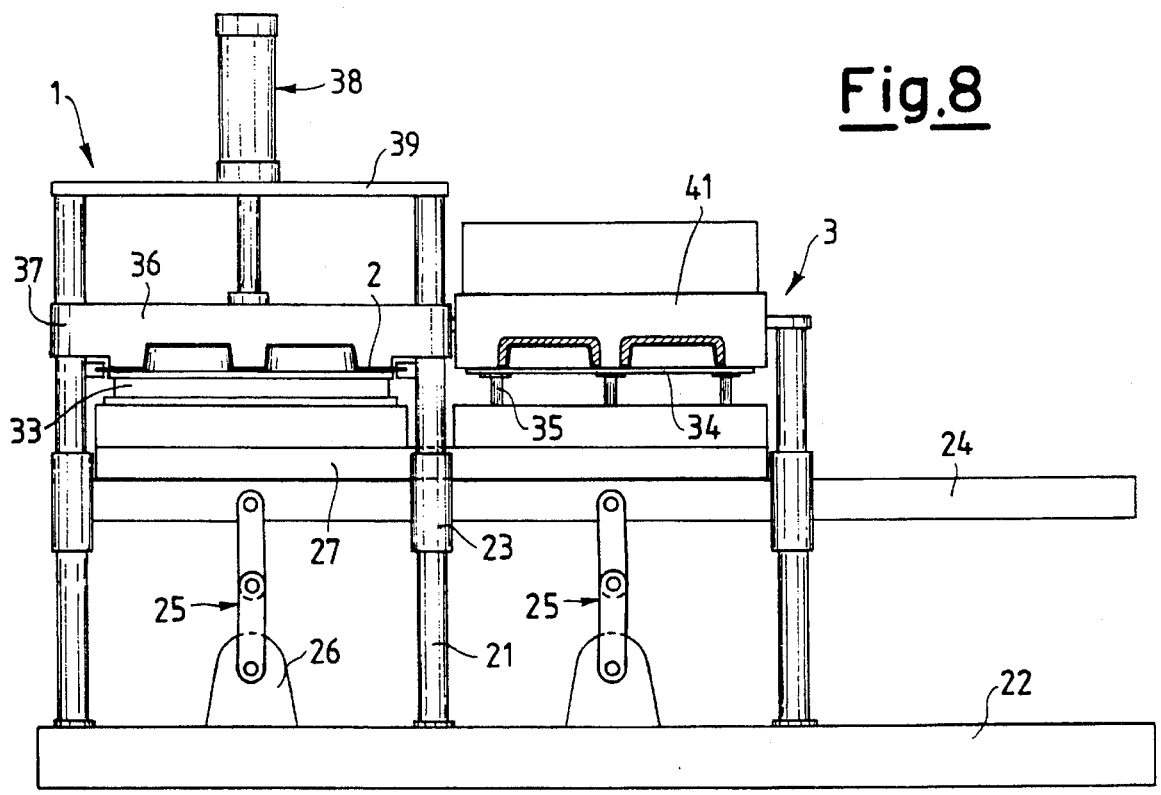

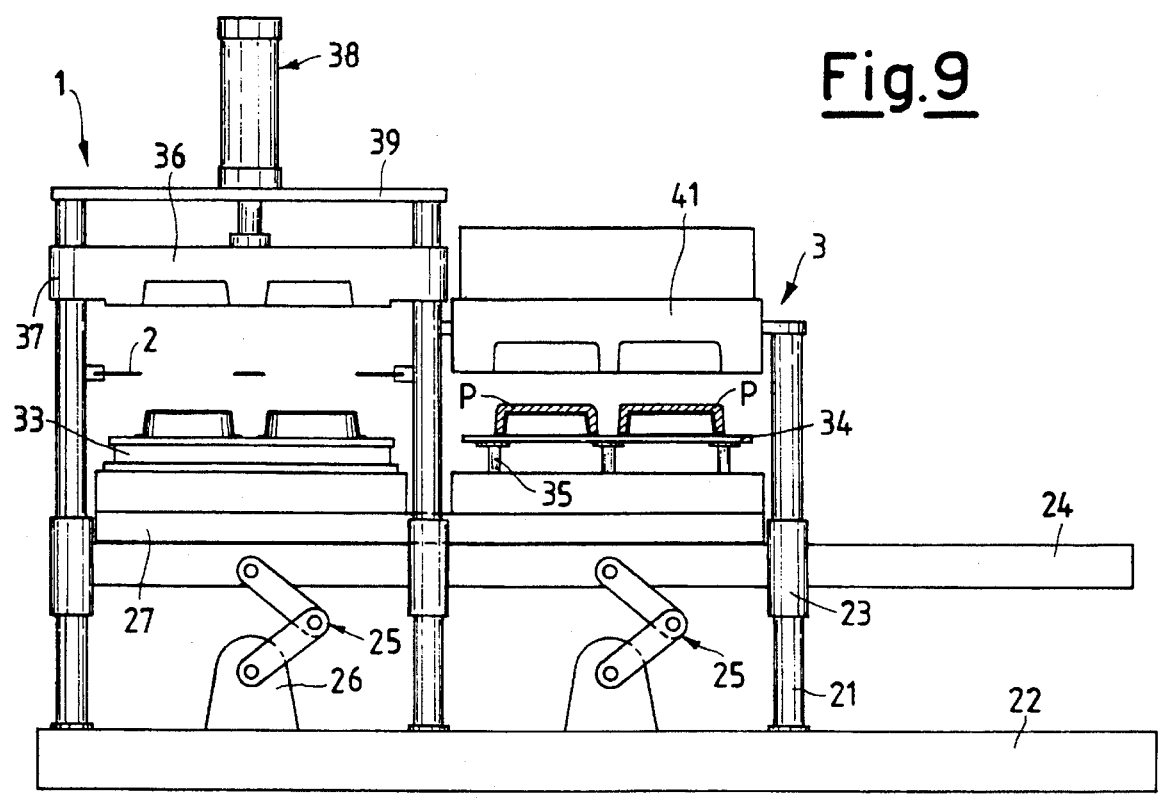
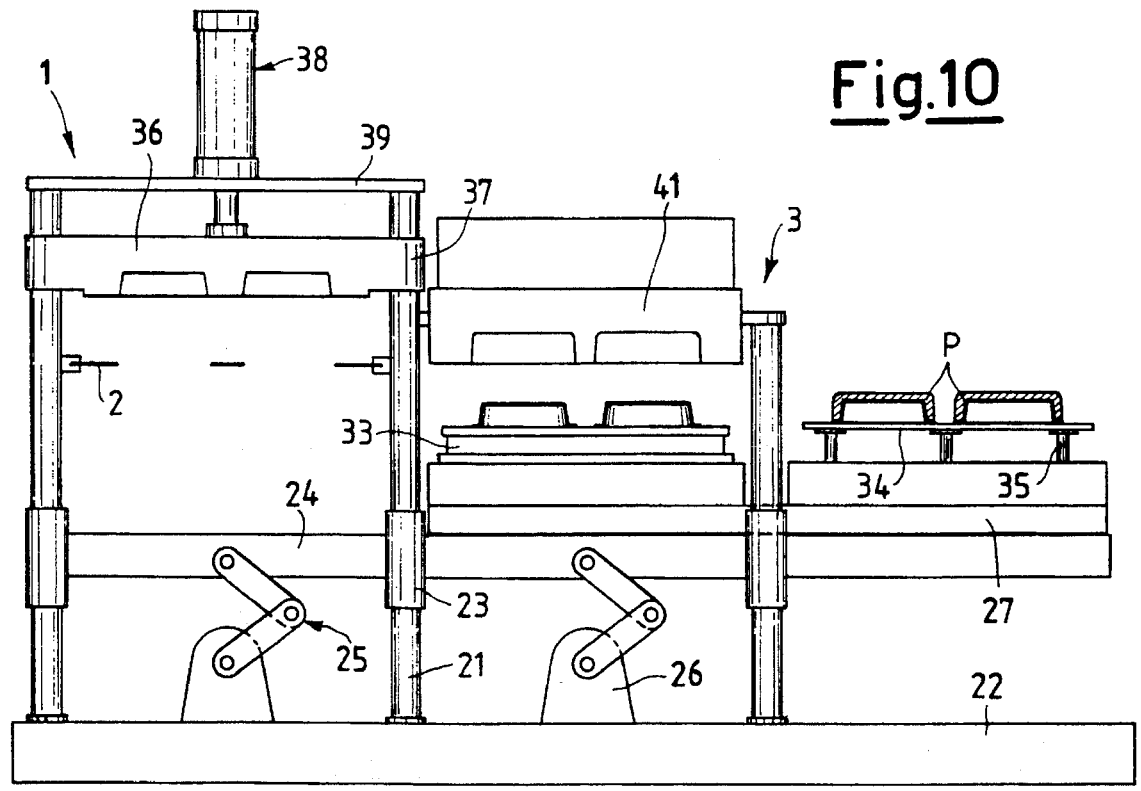

5,482,661

METHOD FOR MOLDING BONDED PLASTICS MATERIAL

This is a Divisional of application Ser. No. 07/876,384 filed Apr. 30,1992, now U.S. Pat. No. 5,304,05.

BACKGROUND OF THE INVENTION

This invention relates to a method for molding bonded plastics material, in particular expanded or foamable plastics material in combination with rigid plastics material, such as expanded polystyrene with rigid sheet polystyrene.

For molding these materials, which requires the application of steam to sinter the expanded foamable plastics material, with its simultaneous adhesion to the rigid material, it is already known from Italian patent No. 1,185,507 to use a mold consisting of two half-mold which together define a molding cavity for housing the two materials, one of which, namely the more rigid sheet material, is firstly preformed in contact with only the lower half-mold, the other material then being molding onto the first by sintering in the closed mold.

In this method, the rigid sheet plastics material is retained at its end edges and then firefly hot-deformed by moving the relative half-mould beyond the plane of the sheet material, after which the material is made to adhere exactly to the half-mold by creating a vacuum between the half-mold and the material. The upper half-mold is then lowered and the expanded foamable plastics material is molded within the resultant cavity, steam being applied in pulses alternating with the application of vacuum, to enable the expanded material to sinter onto the more rigid material.

This known method and apparatus have the advantage of requiring only a single mold consisting of two half-molds movable relative to each other, with resultant constructional advantages. However, a vacuum application stage for preforming is still required, as otherwise it would not be possible to make the more rigid material adhere perfectly to the shape of the preforming half-mold, there being no corresponding counter-mold in that the one provided has a shape which corresponds instead to the part to be molded in expanded material. Vacuum application alone is not always able to produce the required shape, especially in the case of the more complex molds shapes, as in such cases it is difficult to cause the material to adhere to the mold at every point. To overcome this difficulty, preforming has to be effected in a mold separate from the main mold, however this complicates the apparatus because of the larger number of components and the consequent more complicated handling of these and of the material. A further drawback of the known method and apparatus is that those portions of the material which are peripherally clamped undergo inevitable alteration during molding and have mostly to be discarded as the cannot be recycled, this representing a substantial material wastage and posing disposal problems.

BRIEF SUMMARY OF THE INVENTION

The object of the present invention is to overcome the drawbacks and limitations of the known method by providing a method and for molding bonded plastics material which does not require a preforming stage effected exclusively by vacuum, and in addition does not require doubling of the mold arrangement, i.e. the provision of one mold for preforming the rigid material and one for mold the expanded or foamable plastics material onto the rigid material, hence resulting in a constructionally and operationally simplified arrangement.

A further object is to provide a method which enables the scrap material to be recovered without it undergoing alteration during the preforming and/or mold operations. The term "rigid" is to be understood herein in a relative sense, as a material having generally higher intrinsic rigidity characteristics than the plastics material to which it is bonded; this term therefore also covers a material in thin sheet form. These objects are attained according to the present invention by a method for molding bonded plastics material, in particular expanded or foamable plastics material in combination with rigid plastics material, in which the rigid material is firstly preformed and the expanded plastics material is molded onto the rigid material by steam applied in pulses, characterized in that that portion of the rigid material to be preformed is separated from the rigid starting material during the preforming, the preformed material being transferred to the molding stage within the preforming half-mold, the scrap material being conveyed to recovery before the preforming half-mold returns to its preforming position. To implement the method according to the invention, a machine for molding bonded plastics material includes mold for preforming a rigid plastics material and a mold for molding an expanded or foamable plastics material onto the rigid plastics material, means for feeding the rigid plastics material to the preforming mold and means for feeding the expanded plastics material to the molding mold, plus means for applying steam in the form of pulses to said molding mold, characterized in that means for separating the portion of material to be preformed are associated with the preforming mold and operate conjointly with the preforming mold, the two molds having a single movable half-mold associated successively in time with relative preforming and molding counter-molds, the rigid plastics material feed means being operable during the molding or movement stage of the half-mold.

A method of the invention has the advantage of providing perfect preforming in that a counter-mold is used in this stage, and in addition the structure is simplified compared with a machine comprising separate preforming and molding counter-molds, as the present invention uses a single half-mold for both preforming and molding, and only this half-mold has to be moved. As this half-mold moves with only the preformed material portion, and hence separated from the feed material, the scrap can be advantageously carried to recovery without it undergoing any contamination by lubricants, detaching agents, expanded material beads or other substances, so that the scrap can be recycled. In addition the scrap cutting operation after the molding has been unloaded from the machine is eliminated. Special means for clamping the edges of the rigid material are not essential as the half-molds themselves can advantageously clamp the material during preforming, and in addition special means for transferring the preformed material between the molds are not required, as the actual half-mold itself effects the transfer.

BRIEF DESCRIPTION OF THE DRAWINGS

Further details and advantages of the invention will be more apparent from the detailed description of a preferred but not exclusive embodiment thereof given hereinafter and illustrated on the accompanying drawings, wherein.

FIG. 2 is a schematic top plan view of the same machine with certain parts removed for simplicity;

FIG. 4 is an enlarged side elevation of a part of the machine, showing the zone comprising the preforming and molding molds;

FIG. 5 is a cross-sectional view to a larger scale than the preceding figures showing a part of the preforming mold at the moment of preforming;

FIG. 6 is an schematic view of the centralized control section for controlling the operations involved in molding a piece of bonded plastics material; and FIGS. 7 to 12 are schematic side elevational views of part of FIG. 1 on an enlarge scale showing; the successive operating stages in obtaining a piece of bonded plastics material by the method of the invention.

DETAILED DESCRIPTION

Figure 1:
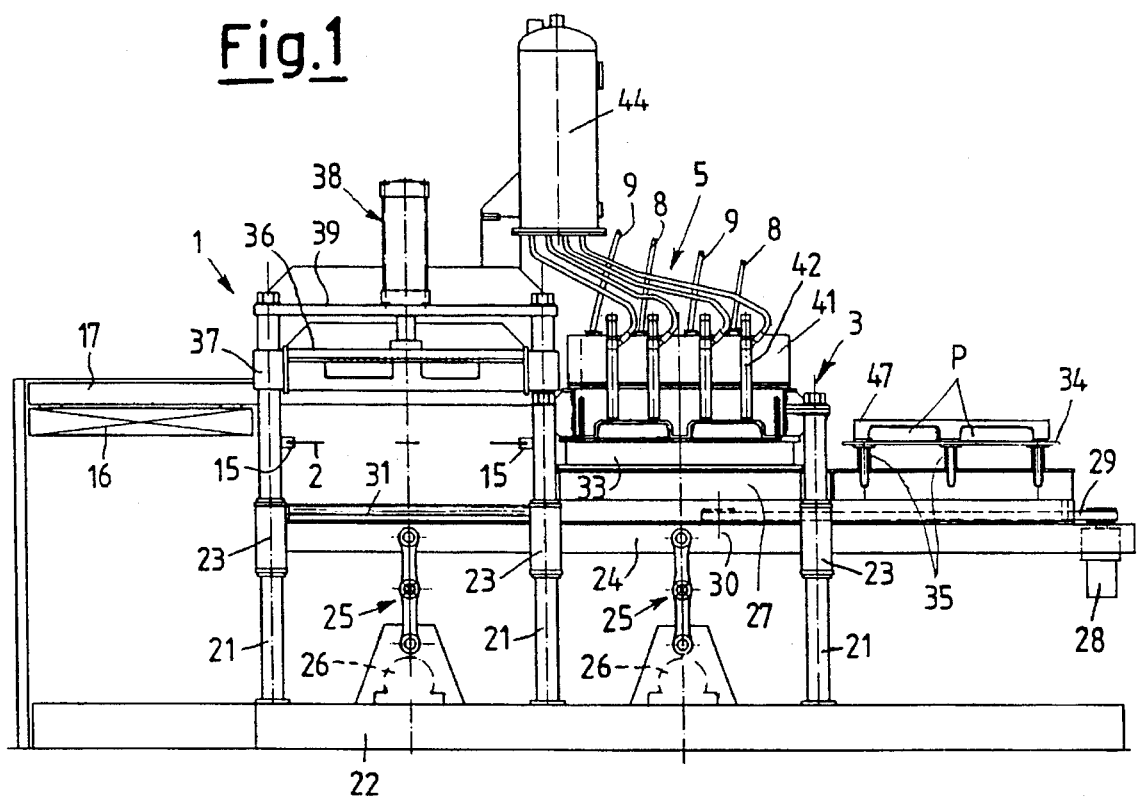
FIG. 1 is a side elevation of a machine for carrying out the method of the invention.
Figure 3:
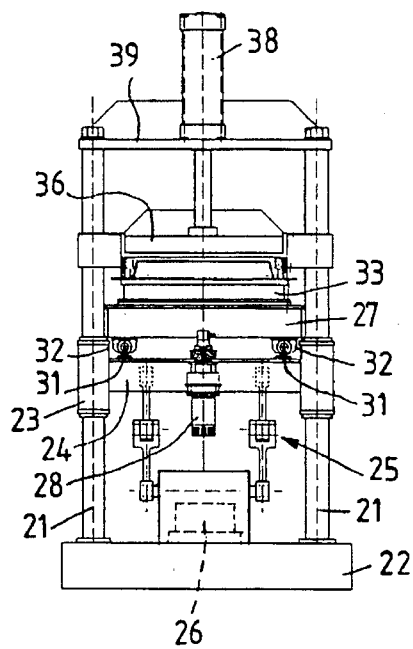
FIG. 3 is a front elevational view of a part of the machine of the preceding figures, limited to only the preforming mold.

With reference firstly to FIGS. 1 to 3, a machine for molding bonded plastics material, such as an expanded or foamable plastics material, in particular expanded polystyrene, in combination with a rigid plastics material, in particular rigid sheet polystyrene, includes substantially a preforming station 1 for the rigid plastics material 2, a molding station 3 for molding the foamable plastics material onto the preformed material, a station 4 for feeding the rigid material 2 to the preforming station 1, and means 5 for feeding the foamable plastics material to the molding station 3.

The machine also comprises a discharge station 6 and, if the rigid plastics material 2 requires it, a preheating station 7 positioned upstream of the preforming station 1. The molding station 3 also comprises means 8 for pulse-feeding steam for sintering the expanded or foamable plastics material, in accordance with a known method, for example as described and illustrated in the cited Italian patent 1,185,507 and feed means 9 for a cooling fluid. The feed station 4 comprises means for feeding the rigid plastics material 2, consisting essentially of a roller 10 for unwinding the material 2 and a roller 11 for winding the scrap 12, the roller 11 being rotated intermittently by a motor 13 controlled by a control center indicated schematically by 14 (see FIG. 6). The material 2 is guided by guide means 15 at least at the preforming station 1, and advances in the direction of the arrow F1.

The preheating station is preferably formed from a preheater 16, in particular of infrared type, supported and guided transversely (arrows F2 in FIG. 2) to the direction of movement of the continuous material 2 by a guide member 17 between an operating position overlying the material 2 (position indicated by full lines in FIG. 2) and a rest position offset to the side thereof (position indicated by dashed lines in FIG. 2). The number of heater elements 18 and/or their power and/or the residence time of the preheater 16 above the material 2 are obviously chosen according to the material and the preforming requirements. The preheater 16 is driven for example by a motor 19 and a belt 20 which is connected at one point to the preheater and deviated about a fixed shaft supported in position within the structure 17. The motor 19 is also controlled by the control center 14. The preforming station 1 and molding station 3 comprise substantially a plurality of spaced-apart vertical columns 21 fixed to a plate-type base 22 and along which there slide relative sleeves 23 with which there is rigid a horizontal platform 24, which can therefore be raised and lowered vertically, for example by means of toggle mechanisms indicated overall by 25, driven in pairs by respective motors 26 which are also controlled by the control center 14.

A table 27 of length substantially equal to the longitudinal horizontal dimension of the two stations 1 and 3 is slidable horizontally on the support 24 in the direction of the arrow F3, i.e. substantially perpendicular to the direction of advancement F1 of the rigid material 2 in the illustrated embodiment. The table 27 is driven by a motor 28 via a belt 29 connected to a point on the table 27 and deviated about a fixed shaft 30, the table 27 being guided on longitudinal guides 31 fixed to the support 24 and slidingly engaged by respective slide blocks 32 of the table 27 within the two rows of columns 21.

The table 27 carries on its left side (FIG. 1) a preforming half-mold 33 and on its right side a resting platform 34, possibly spring-loaded (springs 35), for the molded pieces P. The preforming half-mold 33 cooperates in the preforming station 1 with a counter-mold 36, which in the illustrated embodiment is vertically movable via sleeves 37 slidable on the columns 21, but could also be fixed. The configuration of the facing impressions of the half-mold 33 and counter-mold 36 is such that when in the preforming position, i.e. with the mold closed, they define a preforming cavity corresponding to the shape to be given to the preformed portion of material 2. The counter-mold 36 is movable, for example hydraulically, by means of a cylinder-piston unit 38, of which the cylinder is fixed to a cross-member 39 of the preforming station 1, and the piston is rigid with the counter-mold 36. Its operation is controlled by the control center 14. The half-mold 33 can be provided with temperature control systems and with systems for applying a vacuum to the impression, via suitable passages.

According to one characteristic of the invention, separation or cutting means, best visible in FIG. 5, are associated with the counter-mold 36 and consist of blades 40 arranged in such a manner as to separate from the rigid material 2 the portion to be preformed, by cutting it away peripherally during the preforming stage, as described hereinafter.

The molding station 3 is formed from a fixed half-mold 41 of known type for molding foamable material by steam pulses, for example as described in the cited Italian patent 1,185,507. The drawing therefore illustrates only some generally typical components of this mold, such as the feeders 42 for the material 43, connected to a material container 44, the steam feed pipes 8 and the cooling pipes 9 which terminate in sprayers 45. Condensate discharge means and means for creating a vacuum in the molding cavity are also provided. The reference numeral 46 indicates the impression which cooperates with the impression in the preforming half-mold 33 to define the molding cavity for the two bonded materials (rigid+expanded). The mold also comprises expulsion devices, of known type and therefore not shown in detail, for discharging the molded pieces P.

To the side of the molding station 3 there is a discharge station 6 comprising substantially a pusher element 47 operated for example pneumatically by a cylinder-piston unit 48 controlled by the control center 14 in a direction perpendicular to the direction of movement of the table 27, and a conveyor belt 49 or other conveyor device. The conveyor belt 49 has its upper branch at the level of the resting platform 34 (when the table 27 is in its raised position), on which the pusher 47 also operates, so that the belt 49 receives the molded pieces P from platform 34 and conveys them to a collection device, not shown, in a direction parallel to the feed direction of the material 2. The belt 49 winds about a roller 50 and is driven intermittently by motor means 51 together with the pusher element 47.

As shown schematically in FIG. 6, all the drive members for moving the various previously described movable elements of the machine are controlled by a control center 14 in a predetermined sequence, as will now be described with reference to FIGS. 7 to 12.

The first stage in the molding of the bonded material is the preforming of the rigid plastics material 2. For this purpose the material 2 in strip form is fed through one step and, if necessary, preheated below the preheater 18 positioned in its operating position for a predetermined time, after which the preheater is withdrawn into its rest position. FIG. 7 schematically illustrates the situation slightly before preforming.

In the next step the material 2 reaches its preforming position in the respective 1. The motors 28 and the hydraulic device 38 are operated simultaneously by the control center 14 to bring the two half-molds 33 and 36 into contact with each other substantially in the plane of the material 2 (FIG. 8). This is deformed into the shape of the impressions of the two half-molds, the preformed portion being simultaneously cut away from the material strip 2 along a perimeter line by the blades 40. (FIG. 5) In the illustrated example two pieces are preformed simultaneously, so that two portions 52 are cut away from the strip (FIG. 2), while the scrap 12 remains in a continuous piece and with the subsequent advancement steps of the material 2 is wound onto the roller 11, and can be advantageously recycled after suitable treatment. During the preforming, for which it may be convenient to use vacuum even though this is not essential, the previously molded piece P is retained in the fixed half-mold 41, present in the molding mold 3. the rigid material 2 has been preformed, the control center 14 gives the command for separating the half-molds 33 and 36, and simultaneously operates the members for expelling the piece from the half-mold 41. With the consequent lowering of the table 27 the preformed portion is retained on the half-mould 33, while the previously molded piece P is released from the half-mold 41 and remains on the support platform 34 (FIG. 9).

When the table 27 attains its lowered position the control center 14 transmits a command to the motor 28 to move the table 27 towards the right in FIGS. 7 to 12, to position the half-mold 33 with the preformed piece below the fixed half-mold 41 and position the support table 34 within the discharge zone (FIG. 10).

Figure 11:
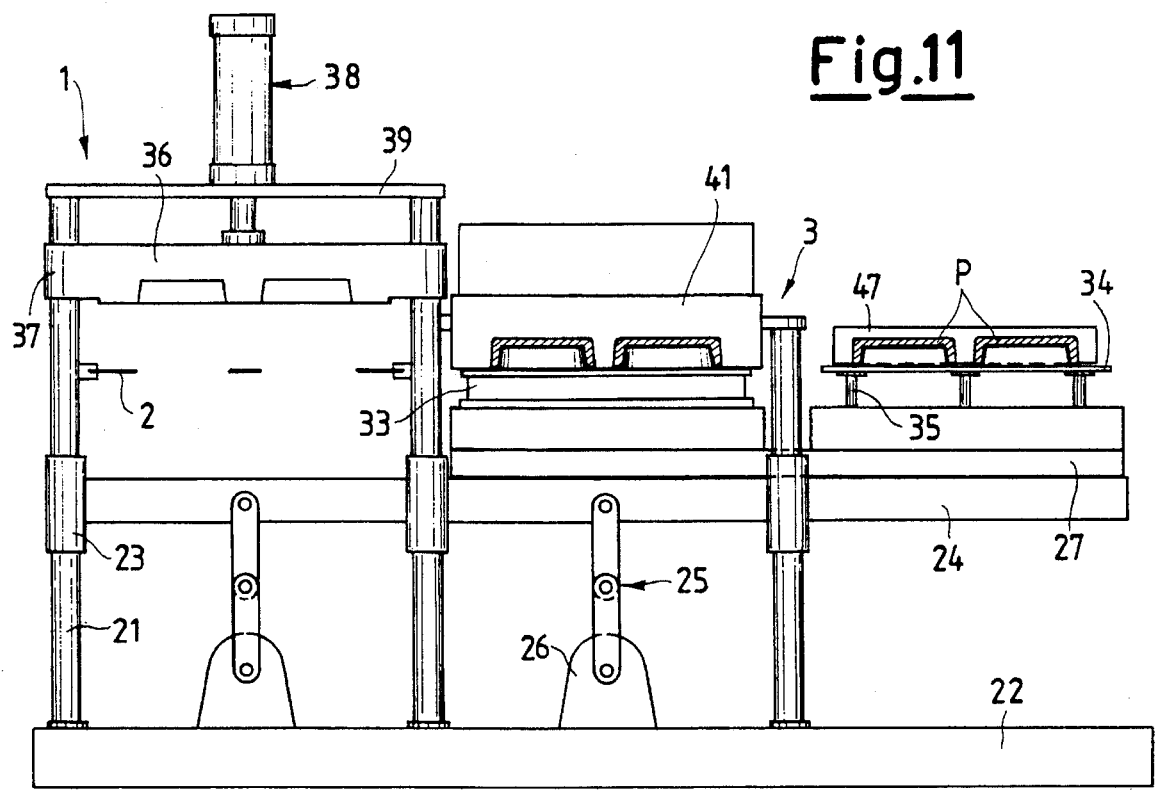

The command for raising the table 27 is now given and the half-molds 33 and 41, come into contact to define the cavity for molding the foamable plastics material by the already known method, the material being injected by the feeders 42 into the molding cavity, and the steam being pulse-fed into the half-mold 41 to sinter the material and bond it to the preformed rigid material, while the pusher 47 is operated to push the prepared piece P, molded during the previous stage, onto the discharge belt 49 (FIG. 11).

Figure 12:
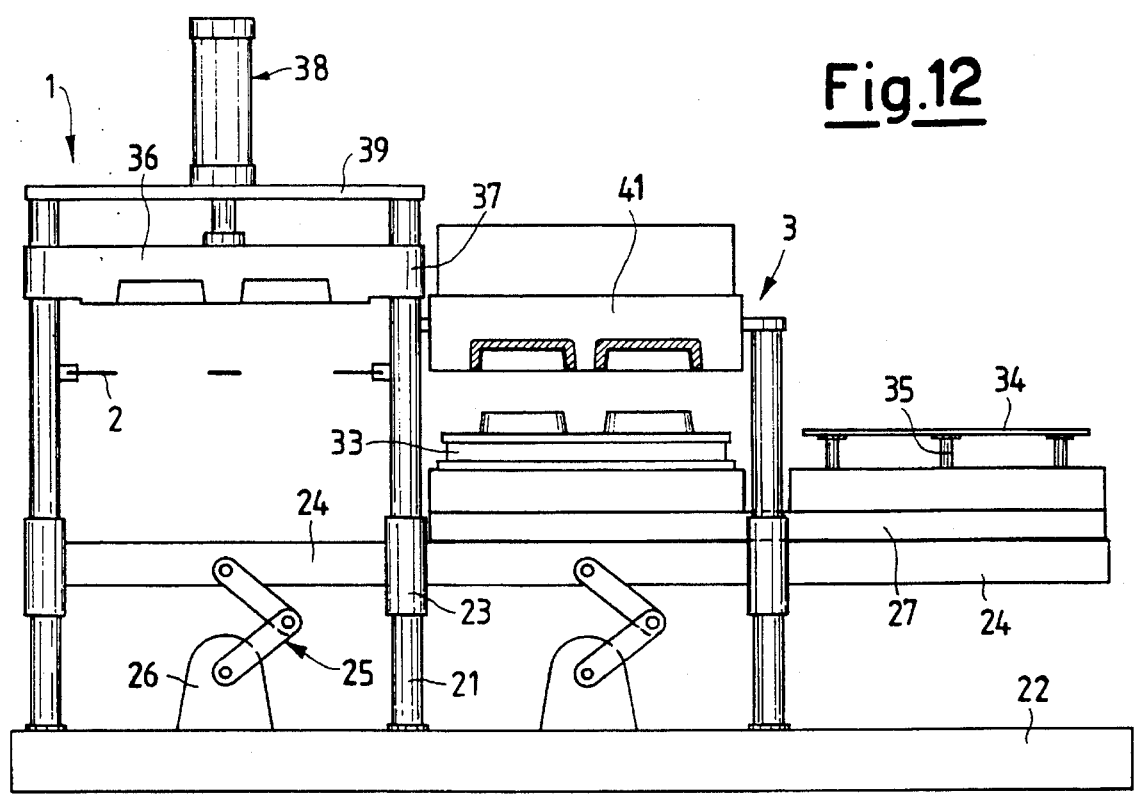

When the molding stage is concluded, the table 27 is lowered and the mold 3 opened, the molding piece P however being retained in the upper half-mold 41, for example by vacuum (FIG. 12). This temporary retention of the piece P in the upper mold 41 can advantageously serve to complete the sintering or cooling operations while the half-mold 33 is moved into the position for preforming the next piece. The strip material 2 has in the meantime been advanced through one step.

It will be apparent that the machine is now in position for a further preforming and molding operation, and the afore-described cycle can be repeated.

For these operations a single half-mold is used, to be moved into cooperation with two half-molds (one for preforming and one for molding, the molding being performed on the rigid material portion after it has been already separated from the feed strip, so that the residual material is in no way subjected to transformation or action which can deteriorate it and make it no longer suitable for reuse or recycling. The particular arrangement of the molds in relation to the feed and discharge makes the machine particularly rational and of small overall size. It should be noted that the same results can be obtained by making the half-mold 36 fixed, hence further simplifying the machine. As the preformed material is fed to the molding stage on the same preforming half-mold, additional means for transferring the material between the preforming and molding stages are not required, and in addition the movement of the fed material is sufficient to recover the scrap. Moreover, the method and machine according to the invention enable bonded material to be molded in which the rigid material is of very small thickness. The machine achieves high productivity, even though the preforming and molding stages take place not simultaneously but in succession. It should however be noted that the preforming time is much shorter than the molding time, it hence being this latter which substantially determines the duration of a molding cycle. As it is in any event necessary to transfer the material from the preforming to the molding operations, the additional time due to the preforming represents a negligible factor compared with the other advantages the invention offers.

As is apparent from the drawings, the method of this invention is suitable for the simultaneous molding of several pieces and/or can be easily adapted in this sense.

Modifications can be made in addition to those already described. For example, the table 27 could be raised hydraulically. The pusher 47 could be operated slightly before or after the molding stage (by arranging the pusher 47 and the belt 49 at the height which the table 27 occupies when in its lowered position). The feed of the rigid material 2 and/or the discharge of the finished pieces P could be in line with the preforming and molding stations 1 and 3 respectively. The movement of the table 27 could also be achieved by a rack and pinion system. It would also be possible to reverse the position of the half-molds 33, 36 and 41 in the sense that the horizontally traversable half-mold could be arranged above the other two.

I claim:

1. A method for continuously forming and molding plastic material to form bonded molded articles comprising:

providing a preforming station, a molding station and a discharge station in spaced relationship with respect to each other;

providing a half-mold movably mounted for movement between said preforming and molding stations;

providing a preforming mold movable between a position spaced from said half-mold and a position in cooperating relationship with said half-mold in said preforming station for forming at least one portion of a plastic sheet material therebetween;

feeding a plastic sheet material into a preforming position between said half-mold and said preforming mold when said molds are in spaced relationship;

moving said half-mold and said preforming mold relatively to each other into said cooperating relationship and forming at least one portion of said plastic sheet material therebetween to form at least one rigid plastic preformed element;

separating said at least one preformed element from said plastic sheet material at said preforming station;

transferring said at least one preformed element on said half-mold from said preforming station to said molding station;

providing a molding mold at said molding station for movement between an open position spaced from said half-mold when in said molding station and a molding position in cooperating relationship with said half-mold in said molding station for molding and bonding foamable plastic material onto said at least one preformed element positioned by said half-mold in said molding station;

moving said half-mold and said molding mold relatively to each other into said molding position to provide at least one mold cavity between said half-mold and said molding mold;

feeding foamable plastic material into said mold cavity and forming a foamed plastic material in said at least one mold cavity and bonding said foamed plastic material to said at least one preformed element to form at least one final bonded molded article;

moving said molding mold and said half-mold in said molding station with respect to each other into said open position while retaining said at least one bonded final molded article on said molding mold;

returning said half-mold from said molding station to said preforming station and simultaneously positioning a table under said molding mold in said molding station;

depositing said at least one final bonded molded article onto said table from said molding mold;

transferring said table with said at least one final bonded molded article thereon to said discharge station for discharging said final bonded molded article simultaneously with transferring a succeeding at least one preformed element from said preforming station to said molding station for a next succeeding molding operation; and transferring scrap material of said plastic sheet material remaining after said separation of said at least one preformed element therefrom to a recovery station prior to returning said half-mold from said molding station to said preforming station.

2. The method as claimed in claim 1 and further comprising:

providing said plastic sheet material in continuous rolled up sheet form;

feeding Said plastic sheet material to said preforming station and stopping said feeding during said preforming; and after said preforming, winding up said plastic sheet material as said scrap material remaining after said separation at said preforming station and simultaneously feeding said plastic sheet material to said preforming station for separating and preforming at least one next succeeding preformed element.

3. The method as claimed in claim 2 and further comprising:

feeding said plastic sheet material in a direction perpendicular to the direction of transferring said half-mold between said preforming station and said molding station.

4. The method as claimed in claim 3 and further comprising:

preheating said plastic sheet material prior to said forming at least one rigid plastic preformed element.

5. The method as claimed in claim 4 wherein:

said preheating comprises irradiating said plastic sheet material with infrared radiation.

6. The method as claimed in claim 5 further comprising:

feeding steam in the form of steam pulses into said at least one mold cavity at said molding station for sintering and bonding said foamed plastic material to said at least one preformed element.

7. The method as claimed in claim 6 and further comprising:

discharging said at least one final bonded molded article in a direction parallel to said direction of feeding said plastic sheet material to said preforming station.

8. The method as claimed in claim 3 and further comprising:

discharging said at least one final bonded molded article in a direction parallel to said direction of feeding said plastic sheet material to said preforming station.

9. The method as claimed in claim 1 wherein:

said depositing of said at least one final bonded molded article onto said table is carried out after a next succeeding preformed element has been preformed.

10. The method as claimed in claim 4 and further comprising:

discharging said at least one final bonded molded article in a direction parallel to said direction of feeding said plastic sheet material to said preforming station.

11. The method as claimed in claim 1 and further comprising:

preheating said plastic sheet material prior to said forming at least one rigid plastic preformed element.

12. The method as claimed in claim 11 wherein:

said preheating comprises irradiating said plastic sheet material with infrared radiation.

13. The method as claimed in claim 12 further comprising:

discharging said at least one final bonded molded article in a direction parallel to said direction of feeding said plastic sheet material to said preforming station.

14. The method as claimed in claim 1 and further comprising:

feeding steam in the form of steam pulses into said at least one mold cavity at said molding station for sintering and bonding said foamed plastic material to said at least one preformed element.

15. The method as claimed in claim 1 and further comprising:

discharging said final bonded molded article in a direction parallel to the direction of feeding said plastic sheet material into said preforming position.

\* \* \* \* \*